(12) United States Patent
Izumoto et al.

(10) Patent No.: US 6,335,377 B1
(45) Date of Patent: Jan. 1, 2002

(54) RECLAIMED RUBBER AND PROCESS FOR RECLAIMING VULCANIZED RUBBER

(75) Inventors: Ryuji Izumoto; Nobumitsu Ohshima, both of Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/428,788

(22) Filed: Oct. 28, 1999

(30) Foreign Application Priority Data

Oct. 28, 1998 (JP) .................................................. 10-306808
Oct. 28, 1998 (JP) .................................................. 10-306809

(51) Int. Cl.$^7$ ...................................................... C08J 11/04
(52) U.S. Cl. ............................ 521/41; 521/44.5; 521/45.5
(58) Field of Search .............................. 521/40, 40.5, 41, 521/42.5, 43, 45, 45.5

(56) References Cited

U.S. PATENT DOCUMENTS

| 3,974,240 | A | * | 8/1976 | Bock et al. | 260/897 B |
| 4,161,464 | A | * | 7/1979 | Nicholas | 260/2.3 |
| 4,225,682 | A | | 9/1980 | O'Neal | 525/76 |
| 4,443,583 | A | | 4/1984 | Musch et al. | 525/215 |
| 4,769,407 | A | | 9/1988 | Obrecht et al. | 524/108 |
| 5,602,186 | A | * | 2/1997 | Myers et al. | 521/41 |
| 5,708,083 | A | | 1/1998 | Kawamura et al. | 525/89 |

FOREIGN PATENT DOCUMENTS

| EP | 26 29 417 A | 1/1977 |
| EP | 0 887 372 A1 | 12/1998 |
| EP | 931809 | * 7/1999 |
| JP | 59-215333 A | 12/1994 |
| JP | 08258110 | * 10/1996 |
| JP | 9-227724 | 9/1997 |
| JP | 09-227724 A | 9/1997 |
| JP | 10-176001 A | 6/1998 |

* cited by examiner

*Primary Examiner*—Edward J. Cain
*Assistant Examiner*—Katarzyna Wyrozebski Lee
(74) *Attorney, Agent, or Firm*—Sughrue, Mion, Zinn, Macpeak & Seas, PLLC

(57) ABSTRACT

Reclaimed rubber having excellent performance is applied for reuse in tires or for asphalt, etc. The reclaimed rubber obtained by devulcanization treatment of vulcanized rubber from discard tires, etc. has a proportion of sol to gel: 10–80%, a weight-average molecular weight (Mw) of the sol by gel permeation chromatography (GPC): 20,000–300,000, and a degree of swelling of the gel: 3.0–20.0. A process for reclaiming the vulcanized rubber is also disclosed.

9 Claims, 2 Drawing Sheets

RECLAIMED RUBBER AND PROCESS FOR RECLAIMING VULCANIZED RUBBER

BACKGROUND OF THE INVENTION

1. Field of the Invention

The present invention relates to reclaimed rubber obtained by devulcanization treatment of vulcanized rubber from discarded tires, etc. for their recycling and to a vulcanized rubber reclaiming process for recycling of vulcanized rubber from discarded tires, etc. The reclaimed rubber is supplied for reuse in tires or for use as a modifying material for asphalt or the like.

2. Description of the Related Art

Various processes have been proposed in the past for reclaiming vulcanized rubber from discarded tires, etc. by destruction of its crosslinked structure, to allow its use for the same purposes as unvulcanized rubber. For example the PAN process, which is widely employed as a reclaim process for vulcanized rubber in Japan, accomplishes devulcanization treatment in a few hours under high pressure vapor. The reclamator process, which is a continuous reclaim process using a single-screw extruder, is also known as a continuous devulcanization treatment by shear force. Examples of the latest known techniques for reclaiming devulcanization of vulcanized rubber by such shear force and heat are disclosed in, for example, Japanese Unexamined Patent Publication No. 9-27724 and Japanese Unexamined Patent Publication No. 10-76001.

Other vulcanized rubber reclaim processes that have been proposed include high-speed mixing devulcanization, microwave devulcanization (SiR, FiX; Elastomerics, 112(2), 38(1980), Japanese Examined Patent Publication No. 2-18696), radiation devulcanization, ultrasonic devulcanization and the like, and some of these are actually being employed.

Thus, a number of processes for reclaiming of vulcanized rubber have been proposed, but none of them can be said to be fully satisfactory processes. For example, although the PAN process has been used for tire materials made primarily of natural rubber (NR) or styrene-butadiene rubber (SBR) for reasons of performance and cost, even the PAN process is insufficient from the standpoints of performance and cost, and therefore the extent of its use is still limited.

In the reclamator process and the aforementioned shear force-utilizing reclaim processes described in Japanese Unexamined Patent Publications No. 9-227724 and No. 10-176001, which are continuous treatment techniques with cost advantages, the treatment capacity has not always been adequate. The other heretofore proposed reclaim processes have also been inadequate in terms of both cost and treatment capacity.

Reclaimed rubber obtained by the aforementioned treatment processes has had the problem of inadequate performance, and therefore it cannot be said, at the current time, that a sufficient degree of research has been conducted on the performance of reclaimed rubber.

SUMMARY OF THE INVENTION

It is therefore an object of the present invention to provide reclaimed rubber with consistently excellent performance among reclaimed rubber obtained by devulcanization treatment.

It is another object of the invention to provide a vulcanized rubber reclaiming process that is a continuous process with cost advantages and has a high treatment capacity.

As a result of diligent research focused on the proportion of gel and sol in reclaimed rubber in an attempt to overcome the problems referred to above, the present inventors have found that the aforementioned object can be attained by limiting the proportion of sol to gel, etc. to within a specified range, and have thus reached completion of the reclaimed rubber of the present invention. Furthermore, as a result of diligent research on the conditions of continuous reclaim with twin-screw extruders, the present inventors have found that the other aforementioned object can be achieved when ring-shaped segments of a specific construction are formed in the screw structure of a twin-screw extruder, and have thus reached completion of the vulcanized rubber reclaim process of the present invention.

According to the invention, there is the provision of reclaimed rubber obtained by devulcanization treatment of vulcanized rubber, wherein the proportion of sol to gel is 10–80%, the weight-average molecular weight (Mw) of the sol by gel permeation chromatography (GPC) is within the range of 20,000–300,000, and the degree of swelling of the gel is 3.0–20.0.

In the reclaimed rubber according to the invention, the above-mentioned proportion is preferably 20–60%, and the weight-average molecular weight (Mw) of the sol by gel permeation chromatography (GPC) is preferably within the range of 30,000–250,000. Also, the degree of swelling of the gel is preferably 4.0–15.0.

Further, according to the invention, there is the provision of a process for reclaiming vulcanized rubber, a twin-screw extruder having a pair of screws being used for devulcanization treatment of vulcanized rubber, wherein at least one pair of mutually interlocking ring-shaped segments is provided at an appropriate location of the pair of screws in the twin-screw extruder.

According to the process of the invention, the rotation rate of the screw in the twin-screw extruder is preferably 20–300 rpm, and the temperature of the cylinder (barrel) at the section of maximum temperature is preferably 100–300° C.

BRIEF DESCRIPTION OF THE DRAWINGS

The invention will be described with reference to the accompanying drawings, wherein.

DESCRIPTION OF THE PREFERRED EMBODIMENT

Figure 1:
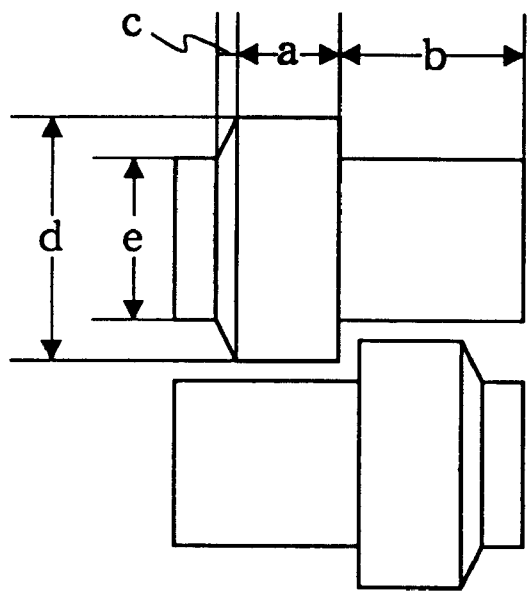
FIG. 1 is a cross-sectional view of a pair of ring-shaped segments.

A preferred embodiment of the invention will now be explained hereinafter.

According to the invention, the vulcanized rubber to be reclaimed means a material obtained by mixing sulfur or a sulfur compound with a polymer to form numerous sulfur crosslinked bonds such as monosulfide bonds, disulfide bonds and polysulfide bonds between carbon chains, for rubber elasticity.

As the polymer component there may be mentioned natural rubber, butadiene rubber, isoprene rubber, butyl rubber, ethylene-propylene rubber, styrene-butadiene rubber, EPDM (ethylene-propylene-diene terpolymer), acryl rubber, acrylonitrile-butadiene rubber, etc.

The vulcanized rubber is obtained from used materials such as rubber tires, weather strips, hoses, or from unnecessary end materials, molding rejects, etc. produced during molding.

The reclaimed rubber of the invention obtained by devulcanization treatment of such vulcanized rubber has a proportion of sol to gel of between 10% and 80%, preferably between 20% and 60%. If the proportion is less than 10%, the gel portion is excess, so that any post-additives such as the sulfur, etc. can not be incorporated sufficiently, thus deteriorating the performance of the reclaimed rubber. On the other hand, if it is more than 80%, the sol portion is excess to the contrary, so that the effect of the sulfur addition is insufficient despite the crosslinked structure. The reclaimed rubber of the invention also has a weight-average molecular weight (Mw) of the sol of from 20,000 to 300,000, preferably 30,000 to 250,000, more preferably 50,000 to 200,000 according to GPC. If the Mw value is less than 20,000, the network formation of the crosslinked structure is insufficient, such that satisfactory performance can not be achieved. On the other hand, if it exceeds 300,000, the viscosity of the material to be treated is too high, and thus the workability is deteriorated.

The reclaimed rubber of the invention also has a gel swelling degree of 3.0 to 20.0, preferably 4.0 to 15.0. If the gel swelling degree is less than 3.0, the dissociation of the gel network is insufficient, such that the gel acts as a contaminant during the vulcanization for obtaining reclaimed rubber, thus making it impossible to achieve satisfactory performance as rubber. On the other hand, if it exceeds 20, there is extensive chain breakage in the gel, thus deteriorating the performance of the reworked vulcanized rubber.

The devulcanization treatment of vulcanized rubber to obtain the reclaimed rubber of the invention may be accomplished by a chemical reagent method or a method of applying shear stress, etc, and it is not particularly restricted.

For application of shear stress to the discarded vulcanized rubber it is preferred to use an apparatus that can heat the discarded vulcanized rubber as the shear stress is applied, and as examples of such apparatuses there may be mentioned twin-screw extruders, Banbury mixers, etc. The devulcanization treatment time is not particularly restricted either, and it may be, for example, 1–5 minutes.

The reclaimed rubber of the invention can be suitably obtained by the vulcanized rubber reclaiming process of the invention described in detail below.

A preferred embodiment of the vulcanized rubber reclaiming process of the invention will now be explained.

Figure 2:
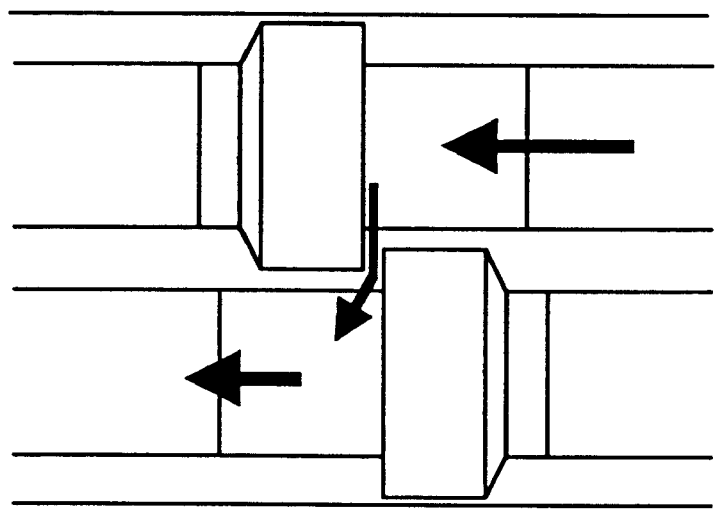
FIG. 2 is an illustration showing treatment by the process of the invention.
Figure 3:
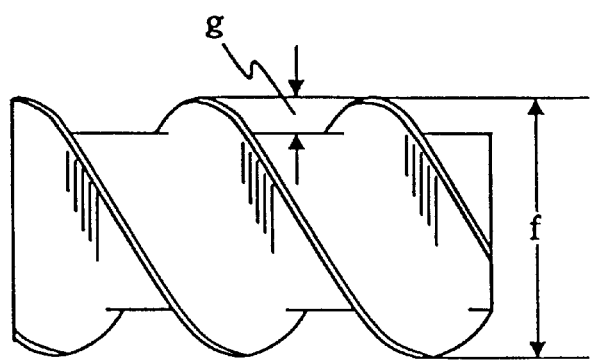
FIG. 3 is a partial side view of a screw segment of the prior art.

According to the reclaiming process of the invention, a conventional twin-screw extruder having a pair of screw segments in the cylinders such as shown in FIG. 3 is provided with at least one pair of mutually interlocking ring-shaped segments at one section of the screw segment structure, such as shown in FIG. 1. The ring-shaped screw segments have a cross-sectional diameter that is larger than the cross-sectional diameter of the screw shaft in at least one location of the pair of screws, and are situated in a mutually interlocking positional relationship. The space between the mutually interlocking rings and the space between the outer perimeter of each ring and the outer perimeter of the other shaft is a distance such that sufficient shear force can be provided to the vulcanized rubber, and is preferably in the range of 0.1–1.5 mm, more preferably 0.2–0.8 mm. As shown in FIG. 1, situating the ring-shaped segments to be mutually interlocking allows sealing of the flow channel of the treated material as shown in FIG. 2, so that only the fluidized material can pass through.

Figure 4:
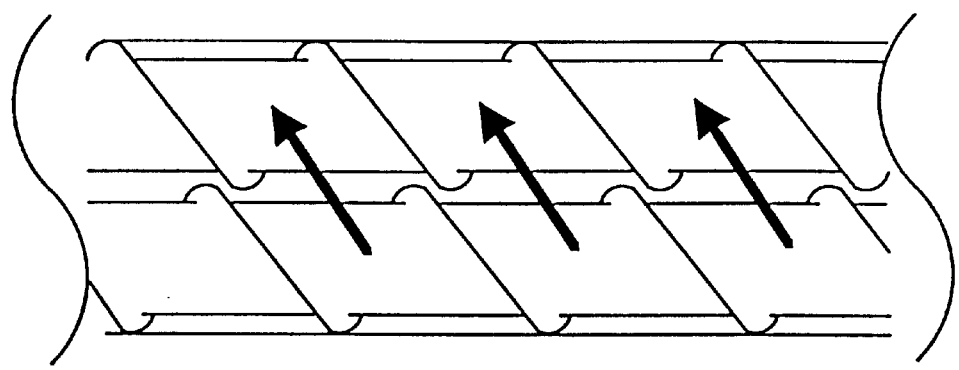
FIG. 4 is an illustration showing treatment by a process of the prior art.

In contrast, in a conventional screw segment system the flow channel of the material is adequately ensured as shown in FIG. 4, although there are differences in the conveying force and kneading force of the material. Consequently, especially in the case of vulcanized rubber that undergoes elastic deformation, it passes through with deformation even if the gap is reduced. The result is that the shear force crushes the vulcanized rubber, and since the crushed rubber can pass through the flow channel of the screw with little resistance if the particle size thereof is of a given fineness, the treatment fails to proceed and the performance of the resulting reclaimed rubber is therefore inadequate.

With the ring-shaped segments of the present invention, however, even vulcanized rubber of a fine particle size cannot pass through the ring-shaped sections, and therefore treatment proceeds with only the unvulcanized material advancing, which results in obtaining reclaimed rubber with good performance.

According to the process of the invention, the resulting reclaimed rubber gives satisfactory performance and treatment is possible with smaller equipment, so that equipment investment and running costs can be minimized and a cost reduction can also be achieved for the treatment materials. This effect can be magnified by providing the ring-shaped segments at two or three locations in a single twin-screw extruder.

According to the process of the invention, the rotation rate of the screws of the twin-screw extruder is from 20 rpm to 300 rpm, preferably from 30 rpm to 200 rpm, more preferably from 40 rpm to 150 rpm. If the rotation rate is less than 20 rpm, the treatment volume is reduced, thus limiting productivity. On the other hand, if it exceeds 300 rpm, the treatment conditions become severe, thus deteriorating the performance of the resulting material.

The section of maximum cylinder temperature in the twin-screw extruder is preferably between 100° C. and 300° C., more preferably between 150° C. and 250° C. A twin-screw extruder usually has the cylinder temperature divided into a few blocks for control, and here the section with the greatest kneading effect is set to the maximum temperature. If the temperature of the maximum temperature region is under 100° C., the devulcanization treatment can not proceed adequately. On the other hand, if it exceeds 300° C., the treatment conditions are too severe, thus drastically promoting degradation of the materials and resulting in lower performance of the resulting material.

The vulcanized rubber reclaiming process of the invention employs the same types of vulcanized rubber to be treated and the same treatment conditions, other than the twin-screw extruder, as conventional processes, and it is not otherwise restricted.

As explained above, the reclaimed rubber of the invention exhibits excellent performance that is satisfactory for reuse. The vulcanized rubber reclaiming process of the invention is a continuous process with cost advantages, and has a high treatment capacity for yielding of satisfactory reclaimed rubber.

The invention will now be explained in further detail by way of examples.

Reclaimed rubber samples were prepared using the different devulcanization processes described as (1) to (3) below, by vulcanizing rubber compositions containing the components listed below at 150° C. for 40 minutes, cutting them into 5 mm×5 mm pieces and subjecting them to devulcanization treatment.

| Components | (phr) |
|---|---|
| NR | 70 |
| SBR | 30 |
| Carbon black | 70 |
| Stearic acid | 2.5 |
| Zinc flower | 6 |
| Vulcanizing accelerator | 1 |
| Sulfur | 2.5 |

PREPARATION OF SAMPLES (1) Twin-screw extrusion method

A PCM45 twin-screw extruder (length (L): 1440 mm, diameter (D): 45 mm, L/D=32) manufactured by Ikegai Tekko, KK. was used with a maximum temperature region temperature of 100–300° C. and a rotation rate of 50–150 rpm.

(2) Banbury method

Plastomill BR-250 manufactured by Toyo Seiki, KK. was used with a maximum temperature region temperature of 100–250° C. and a rotation rate of 30–100 rpm.

(3) Chemical reagent method

After immersion in o-dichlorobenzene, heat treatment was carried out at a temperature of 100–200° C. and an immersion time of 1–10 hours.

These three treatment methods were used for treatment under varying conditions. The values for the reclaimed rubber obtained by these treatments are shown in Table 1 below.

The gel measurements shown in the table were made in the following manner.

First, approximately 0.5 g of the reclaimed rubber was weighed out to four decimal places, and this was recorded as value (A). The weighed out rubber was then immersed in about 100 ml of toluene in a 100 ml Erlenmeyer flask and allowed to stand for a day and a night.

The toluene solution and rubber were filtered with a 200 mesh stainless steel wire mesh (B) that had been previously weighed out to four decimal places, for separation. After filtration, air drying was carried out for about 5 minutes (until the toluene in the wire mesh gaps evaporated), and the toluene-containing rubber and wire mesh were weighed and the value recorded as (C). After the weighing, each wire mesh was laced in a vacuum drier and vacuum dried at 70° C. for a day and a night, and after the drying the weight was again measured to four decimal places and recorded as value (D). These values (A) to (D) were used to determine the gel content (%) and degree of swelling according to the following equations.

$$\text{Gel content } (\%) = ((D)-(B))/(A) \times 100$$

$$\text{Degree of swelling} = ((C)-(D))/((D)-(B)) \times 100$$

The toluene solution separated from the rubber by filtration according to the procedure described above was diluted with a GPC developing solution and subjected to GPC measurement, and the weight-average molecular weight (Mw) was determined by a calibration curve drawn with a standard polystyrene sample.

The rubber breaking energy was evaluated by adding 1.4 parts by weight of sulfur to 100 parts by weight of the treated reclaimed rubber for reclaiming vulcanization at 150° C. for 40 minutes, and then subjecting the resulting vulcanized rubber to a tensile test. The results were expressed as an index with respect to 100 as the breaking energy for the reclaimed rubber of Comparative Example 1. A larger value indicates a more satisfactory result. The Lanborn abrasion resistance was evaluated by a Lanborn abrasion tester using the same sample, and expressed as an index with respect to 100 as the value for the reclaimed rubber of Comparative Example 1. A larger value indicates a more satisfactory result. The results obtained are listed in Table 1 below. Comparative Example 1 was rubber reclaimed by the PAN process.

TABLE 1

| | Sample preparation method | Sol/gel proportion (%) | Mw of sol | Gel swelling degree | Breaking energy (index) | Lanborn abrasion resistance (index) |
|---|---|---|---|---|---|---|
| Comparative Example 1 | PAN | 25 | 12000 | 535 | 100 | 100 |
| Comparative Example 2 | Chemical reagent | 7 | 26000 | 3.20 | 81 | 91 |
| Comparative Example 3 | Chemical reagent | 24 | 66000 | 2.10 | 100 | 98 |
| Comparative Example 4 | Banbury | 28 | 7000 | 5.50 | 94 | 99 |
| Comparative Example 5 | Twin-screw extrusion | 83 | 24000 | 23.70 | 98 | 100 |
| Example 1 | Chemical reagent | 14 | 258000 | 4.70 | 172 | 157 |
| Example 2 | Banbury | 15 | 34000 | 6.10 | 155 | 122 |
| Example 3 | Chemical reagent | 26 | 60000 | 6.70 | 223 | 201 |
| Example 4 | Twin-screw extrusion | 31 | 142000 | 12.50 | 305 | 220 |
| Example 5 | Chemical reagent | 34 | 225000 | 10.90 | 267 | 211 |
| Example 6 | Twin-screw extrusion | 49 | 84000 | 8.60 | 250 | 188 |
| Example 7 | Banbury | 66 | 49000 | 18.20 | 164 | 138 |

As clearly shown in Table 1, the reclaimed rubber of the examples all exhibited satisfactory performance. The results of these examples are given for 100% devulcanized rubber, but a satisfactory effect is also obtained using a mixture with fresh rubber, and the treated rubber may also be used not only alone but in mixtures with various types of rubber.

The twin-screw extruder of (1) above was used for treatment of 5 mm×5 mm vulcanized rubber prepared in the manner described above, with the various screw segment settings shown in Table 2 below. The treatment conditions were as shown in Table 3 below.

TABLE 2

| Screw segment | Screw structure ratio | | | | |
|---|---|---|---|---|---|
| | I | II | III | IV | V |
| Ring segment*1 | 0 | 1 | 1 | 2 | 0 |
| Rotor segment | 0 | 0 | 1 | 2 | 0 |
| Full flight screw (deep groove)*2 | 4 | 4 | 4 | 4 | 4 |
| Full flight screw (shallow groove) | 8 | 7 | 6 | 4 | 10 |
| Full flight screw (tapered) | 3 | 3 | 3 | 3 | 3 |
| Kneading desk | 2 | 2 | 2 | 2 | 0 |

*1Ring structure shown in FIG. 1 (a: 17 mm, b: 26 mm, c: 3.5 mm, d: 42 mm, e: 35 mm)
*2Screw structure shown in FIG. 3 (f: 42 mm, g: 5 mm)

TABLE 3

| | Screw structure | Temperature of maximum temperature region of cylinder (° C.) | Rotation rate (rpm) | Rubber breaking energy (index) |
|---|---|---|---|---|
| Comparative Example 7 | I | 200 | 100 | 98 |
| Comparative Example 8 | V | 200 | 100 | 105 |
| Example 8 | II | 200 | 100 | 200 |
| Example 9 | III | 200 | 100 | 250 |
| Example 10 | IV | 200 | 100 | 305 |
| Comparative Example 6 | PAN | — | — | 100 |

The rubber breaking energies in Table 3 are shown in the same manner as in Table 1. The results are expressed as the index with respect to 100 as the breaking energy of rubber reclaimed by the PAN process. A larger value indicates a more satisfactory result.

As clearly shown in Table 3, the reclaimed rubber of the examples all exhibited satisfactory performance.

What is claimed is:

1. Reclaimed rubber obtained by devulcanization treatment of vulcanized rubber, wherein a proportion of sol to gel is 10–80%, a weight-average molecular weight (Mw) of said sol by gel permeation chromatography (GPC) is within a range of 20,000–300,000, and a degree of swelling of said gel is 3.0–20.0.

2. The reclaimed rubber according to claim 1, wherein said proportion is 20–60%.

3. The reclaimed rubber according to claim 1, wherein the weight-average molecular weight (Mw) of said sol by gel permeation chromatography (GPC) is within a range of 30,000–250,000.

4. The reclaimed rubber according to claim 1, wherein the degree of swelling of said gel is 4.0–15.0.

5. A process for reclaiming vulcanized rubber, comprising subjecting vulcanized rubber to a devulcanization treatment using a twin screw extruder,
wherein said twin-screw extruder comprises a screw structure comprising a pair of screws and wherein said pair of screws comprises at least one pair of mutually interlocking ring-shaped segments and wherein said rubber reclaimed has a proportion of sol to gel of 10–80%, a weight average molecular weight how) of said sol by gel permeation chromatography (GPC) is within a range of 20,000–300,000, and a degree of swelling of said gel is 3.0–20.0.

6. The process for reclaiming vulcanized rubber according to claim 5, wherein a rotation rate of a shaft in said twin-screw extruder is 20–300 rpm, and a temperature of a section of a cylinder at maximum temperature is 100–300° C.

7. The process for reclaiming vulcanized rubber according to claim 5, wherein a space between an outer perimeter of each of the mutually interlocking ring-shaped segments of the pair and an outer perimeter of a shaft of the other one of the mutually interlocking ring-shaped segment of the pair is in the range of from 0.1 to 1.5 mm.

8. The process for reclaiming vulcanized rubber according to claim 5, wherein a space between an outer perimeter of each of the mutually interlocking ring-shaped segments of the pair and an outer perimeter of a shaft of the other one of the mutually interlocking ring-shaped segment of the pair is in the range of from 0.2 to 0.8 mm.

9. The process for reclaiming vulcanized rubber according to claim 5, comprising two or three pairs of mutually interlocking ring-shaped segments.

* * * * *